US012590809B2

(12) United States Patent
Fukui et al.

(10) Patent No.: US 12,590,809 B2
(45) Date of Patent: Mar. 31, 2026

(54) INFORMATION PROVIDING DEVICE, INFORMATION PROVIDING METHOD, AND INFORMATION PROVIDING PROGRAM

(71) Applicant: PIONEER CORPORATION, Tokyo (JP)

(72) Inventors: Kotaro Fukui, Saitama (JP); Masahiro Iwata, Saitama (JP); Shinichiro Iino, Saitama (JP); Shota Izumi, Saitama (JP); Yohei Onuma, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 323 days.

(21) Appl. No.: 17/914,285

(22) PCT Filed: Jan. 14, 2021

(86) PCT No.: PCT/JP2021/000996
§ 371 (c)(1),
(2) Date: Dec. 1, 2022

(87) PCT Pub. No.: WO2021/192522
PCT Pub. Date: Sep. 30, 2021

(65) Prior Publication Data
US 2023/0228586 A1     Jul. 20, 2023

(30) Foreign Application Priority Data
Mar. 27, 2020     (JP) ................................. 2020-058581

(51) Int. Cl.
*G01C 21/36*     (2006.01)
*G10L 17/22*     (2013.01)
(Continued)

(52) U.S. Cl.
CPC ..... *G01C 21/3629* (2013.01); *G01C 21/3608* (2013.01); *G10L 17/22* (2013.01); *G10L 21/034* (2013.01); *G10L 21/0364* (2013.01)

(58) Field of Classification Search
CPC . G01C 21/3629; G01C 21/3608; G10L 17/32; G10L 21/034; G10L 21/0364
See application file for complete search history.

(56) References Cited

U.S. PATENT DOCUMENTS

| | | | | | |
|---|---|---|---|---|---|
| 9,098,467 | B1 * | 8/2015 | Blanksteen | ............. | G10L 15/22 |
| 2004/0111214 | A1 * | 6/2004 | Buecher | ........... | G08G 1/096811 |
| | | | | | 340/995.19 |

(Continued)

FOREIGN PATENT DOCUMENTS

| | | | | |
|---|---|---|---|---|
| JP | 2006-38705 A | 2/2006 | | |
| JP | 2018-87871 A | 6/2018 | | |
| WO | WO-2017138935 A1 * | 8/2017 | ............. | B60R 25/04 |

*Primary Examiner* — Anil K Bhargava
(74) *Attorney, Agent, or Firm* — Procopio, Cory, Hargreaves Savitch LLP

(57)     ABSTRACT

The present invention provides an information provision device and the like capable of reliably providing necessary guidance information while reducing the amount of audio information that is necessary for processing.
The information provision device is provided with: a guidance voice output control unit 1 and a speaker 10 which output a guidance voice; a microphone 11 and a collected sound transmission unit 2 which collect sounds that are made after the guidance voice starts to be output, wherein the guidance voice output control unit 1 and the speaker 10 output re-guidance voice corresponding to the guidance voice, on the basis of the result of determination of whether the collected sounds include a specific sound.

13 Claims, 3 Drawing Sheets

(51) Int. Cl.
    G10L 21/034     (2013.01)
    G10L 21/0364     (2013.01)

(56)                References Cited

U.S. PATENT DOCUMENTS

2006/0074684 A1\*   4/2006   Yoshida ................. G01C 21/36
                                      704/271
2008/0221792 A1\*   9/2008   Nakayama ......... G01C 21/3655
                                      701/431
2017/0102244 A1\*   4/2017   Meredith ........... G01C 21/3629
2020/0166368 A1\*   5/2020   Iijima ................. G05D 1/0221

\* cited by examiner

INFORMATION PROVIDING DEVICE, INFORMATION PROVIDING METHOD, AND INFORMATION PROVIDING PROGRAM

TECHNICAL FIELD

The present application pertains to the technical field of an information providing device, an information providing method, and an information providing program. More specifically, the present application pertains to the technical field of an information providing device and an information providing method for providing necessary information by sound output, and of a program for the information providing device.

BACKGROUND ART

For a navigation device that guides movement of a moving body such as a vehicle, in recent years, research and development on a navigation system utilizing a portable terminal device such as a smartphone have been activated in addition to a conventionally generalized navigation device to be mounted on a moving body.

At this time, guidance using sound including guidance voice is important to a case where the portable terminal device is used, because of the limitation in the size of a display provided in the portable terminal device or the like. As a document disclosing the prior art corresponding to such a background, for example, Patent Document 1 below can be cited. In the prior art disclosed in Patent Document 1, in the words (word) uttered by an occupant such as a driver, content of a word representing miss hearing is recognized by voice recognition, and guidance corresponding to the word that has not been detected is provided again.

Citation List Patent Document

Patent Document 1: JP 2018-87871 A

SUMMARY OF THE INVENTION

Problem to be Solved by the Invention

Here, in the prior art described in Patent Document 1 mentioned above, collecting sound of a voice uttered by an occupant and recognizing the content thereof are always executed. Then, in a case where the aforementioned recognition is executed by an external server from the viewpoint of reducing the processing load in the portable terminal device and the power consumption accompanying the processing load, the recognition result needs to be constantly transmitted to the external server. However, in this case, the amount of communication with the external server becomes enormous, and as a result, there are the problems that the processing speed is lowered and making a new connection is difficult. In addition, even in a case where the recognition is performed by the terminal device, the processing load may increase.

Therefore, the present application has been made in view of the above problems, and an example of the problem is to provide an information providing device and an information providing method capable of reliably providing necessary guidance information while reducing the amount of information as voice necessary for processing, and a program for the information providing device.

Means for Solving the Problem

In order to solve the above-mentioned problem, the invention described in claim 1 is an information providing device comprising: a first output means that outputs provision information to be provided, by sound; a sound collection means that collects a sound after start of output of the provision information; and a second output means that outputs correspondence information corresponding to the provision information by sound on the basis of a determination result as to whether a preset specific voice is included in the collected sound.

In order to solve the above-mentioned problem, the invention described in claim 8 is an information providing method executed in an information providing device comprising a first output means, a sound collection means, and a second output means, the information providing method comprising: a first output step of outputting, by the first output means, provision information to be provided, by sound; a sound collection step of collecting, by the sound collection means, a sound after start of output of the provision information; and a second output step of outputting, by the second output means, correspondence information corresponding to the provision information on the basis of a determination result as to whether a preset specific voice is included in the collected sound, by a sound.

In order to solve the above-mentioned problem, the invention described in claim 9 causes a computer function as: a first output means that outputs provision information to be provided, by sound; a sound collection means that collects a sound after start of output of the provision information; and a second output means that outputs correspondence information corresponding to the provision information by sound on the basis of a determination result as to whether a preset specific voice is included in the collected sound.

EMBODIMENT FOR CARRYING OUT THE INVENTION

Next, an embodiment of the present application will be described with reference to FIG. 1. Note that FIG. 1 is a block figure illustrating a schematic configuration of an information providing device according to the embodiment.

Figures 1, 2:
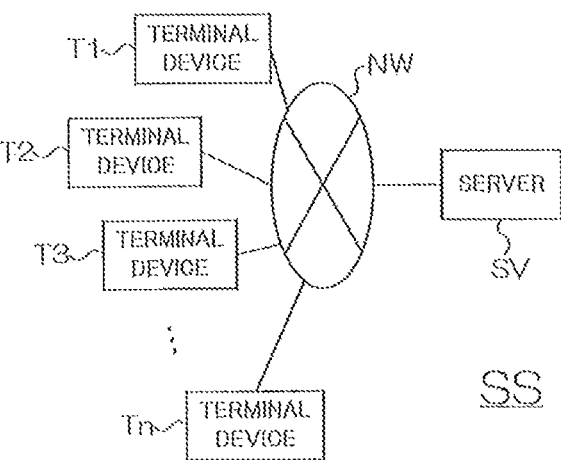
FIG. 1 is a block figure illustrating a schematic configuration of an information providing device according to an embodiment.
FIG. 2 is a block figure illustrating a schematic configuration of a navigation system according to an example.

As illustrated in FIG. 1, an information providing device S according to the embodiment comprises: a first output means 1; a sound collection means 2; and a second output means 3.

In this configuration, the first output means 1 outputs provision information to be provided, by sound. Guidance information or the like for guiding a moving body such as a vehicle corresponds to an example of the provision information.

Meanwhile, the sound collection means 2 collects the sound after the first output means 1 starts outputting the provision information.

Then, the second output means 3 outputs correspondence information corresponding to the provision information by sound on the basis of a determination result as to whether a preset specific voice is included in the sound collected by the sound collection means 2.

At this time, the specific voice is, for example, a specific voice such as "uh-huh?" or "eh?" representing miss hearing or desire to listen again that the occupant of the moving body uttered.

As described above, with the operation of the information providing device S according to the embodiment, the correspondence information corresponding to the provision information is output by sound on the basis of the determination result as to whether the specific voice is included in the sound after the start of output of the provision information. Therefore, it is possible to reliably provide the provision information while reducing the amount of information as the sound to be collected.

EXEMPLARY EMBODIMENTS

Next, specific examples corresponding to the above-described embodiment will be described with reference to FIGS. 2 to 4. Note that the example described below is an example in a case where the present application is applied to route guidance using sound (voice) in a navigation system comprising a terminal device and a server connected to be able to exchange data with each other via a network such as the Internet.

Figure 3A:
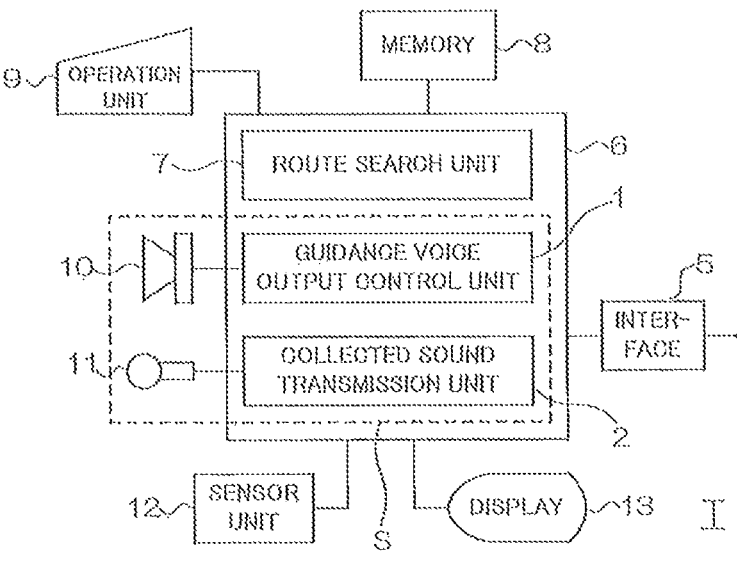
FIG. 3 is a block figure illustrating a schematic configuration of a terminal device or the like according to the example, FIG. 3(*a*) is a block figure illustrating a schematic configuration of the terminal device, and FIG. 3(*b*) is a block figure illustrating a schematic configuration of a server according to the example.
Figure 3B:
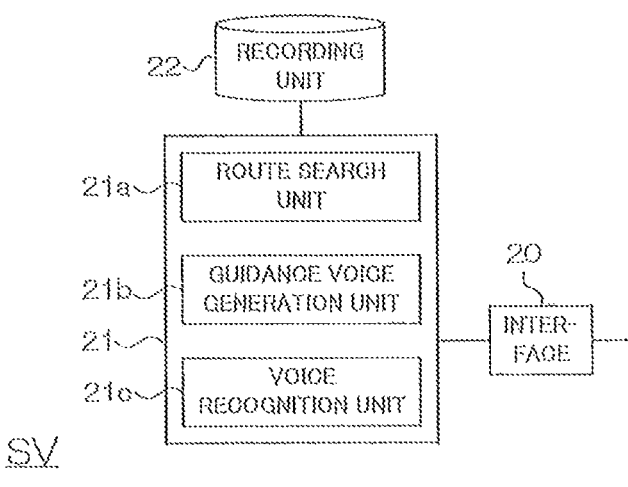
Figure 4:
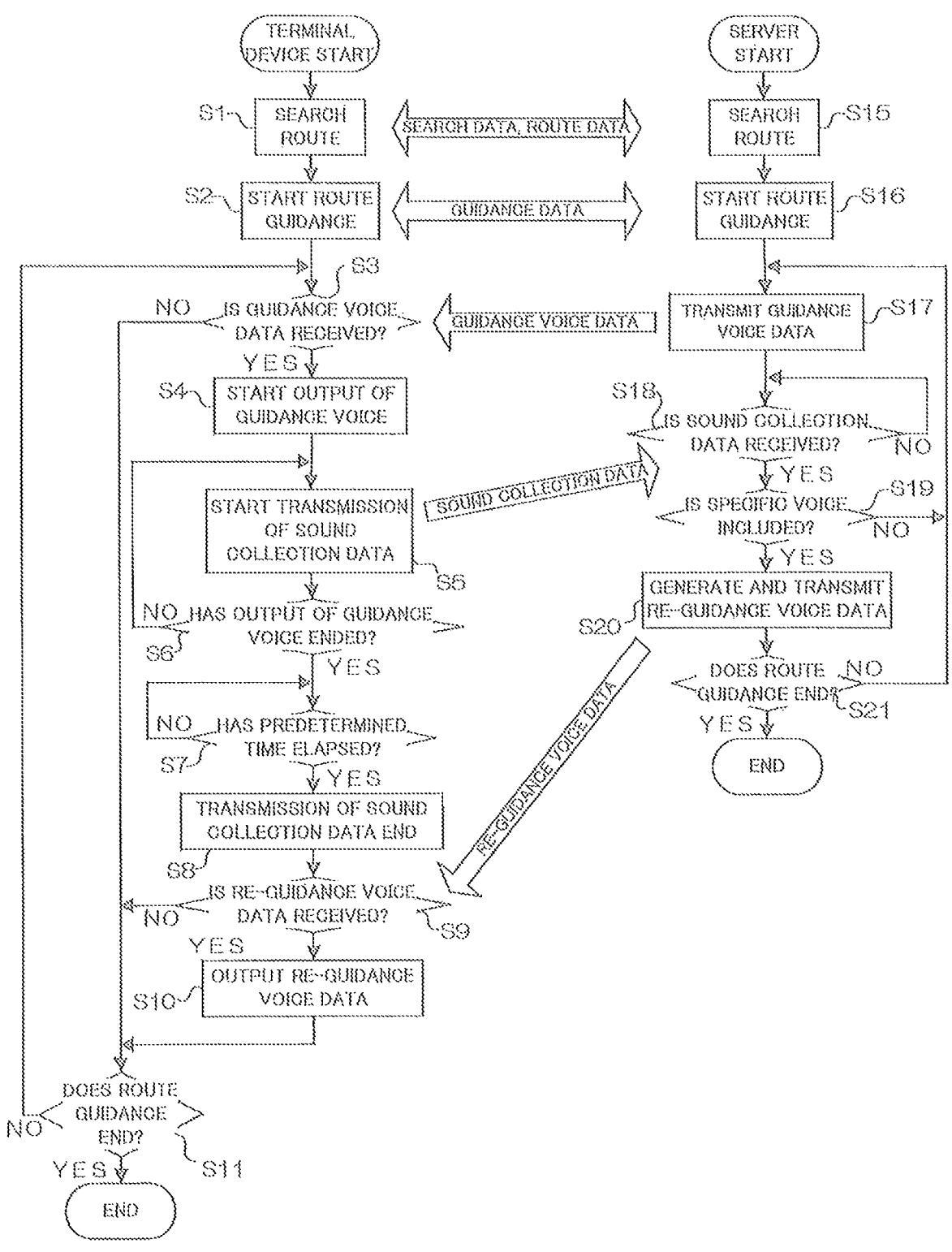
FIG. 4 is a flowchart illustrating navigation processing according to the example.

In addition, FIG. 2 is a block figure illustrating a schematic configuration of a navigation system according to the example, FIG. 3 is a block figure illustrating a schematic configuration of a terminal device or the like according to the example, and FIG. 4 is a flowchart illustrating navigation processing according to the example. At this time, in FIG. 3, for some of the constituent members of the example corresponding to the respective constituent members in the information providing device S according to the embodiment illustrated in FIG. 1, the same member numbers as those of the respective constituent members in the information providing device S are used.

As illustrated in FIG. 2, a navigation system SS of the example comprises: one or a plurality of a terminal device T1, a terminal device T2, a terminal device T3, . . . , and a terminal device Tn (n is a natural number) each operated in a moving body such as a vehicle by an occupant of the moving body (more specifically, a driver or a passenger of the moving body); a server SV; and a network NW such as the Internet that connects the terminal device T1, the terminal device T2, the terminal device T3, . . . , and the terminal device Tn to the server SV so as to enable exchanging data. Note that, in the following description, the terminal device T1 to the terminal device Tn will be collectively referred to as a "terminal device T" when a configuration or the like common to them is described. At this time, the terminal device T is specifically implemented as, for example, so-called a smartphone or a tablet-type terminal device.

In this configuration, each terminal device T individually exchanges various data with the server SV via the network NW, and provides guidance of movement to the occupant who uses the terminal device T. The data exchanged at this time includes search data for searching for a route on which the moving body has to move and guidance data after the movement along the searched route is started. Here, for example, because of the limitation in the size of the display for indication provided in the terminal device T or the limitation in the processing load, or in order to prevent a screen from being gazed, the guidance of movement to the occupant is mainly performed using voice or sound in the navigation system SS. Therefore, the guidance data transmitted from the server SV to each terminal device T includes voice data for guidance by the voice or sound. Note that, in the following description, the voice data for guidance is simply referred to as "guidance voice data".

Next, the configuration and operation of each terminal device T and the server SV will be described with reference to FIG. 3. First, as illustrated in FIG. 3(a), each of the terminal devices T of the example comprises: an interface 5; a processing unit 6 comprising a CPU, a random access memory (RAM), a read only memory (ROM), and the like; a memory 8 including a volatile region and a nonvolatile region; an operation unit 9 comprising a touch panel, an operation button, and the like; a speaker 10; a microphone 11; a sensor unit 12 comprising a global positioning system (GPS) sensor and/or a self-contained sensor, and the like; and a display 13 comprising a liquid crystal or an organic electro luminescence (EL) display, and the like. In addition, the processing unit 6 includes: a route search unit 7; a guidance voice output control unit 1; and a collected sound transmission unit 2. At this time, each of a route search unit 7, the guidance voice output control unit 1, and the collected sound transmission unit 2 may be implemented with hardware logic circuitry including the above-described CPU or the like constituting the processing unit 6, or may be implemented with software by the CPU or the like reading out and executing a program corresponding to a flowchart illustrating processing on the terminal device T in navigation processing of an example described later. In addition, the guidance voice output control unit 1 and the speaker 10 correspond to an example of the first output means 1 and the second output means 3 according to the embodiment, the microphone 11 and the collected sound transmission unit 2 correspond to an example of the sound collection means 2 according to the embodiment and an example of the "transmission means" according to the present application, and the interface 5 corresponds to an example of the "acquisition means" according to the present application. In addition, as indicated by a broken line in FIG. 3(a), the guidance voice output control unit 1, the speaker 10, the microphone 11, and the collected sound transmission unit 2 constitute an example of the information providing device S according to the embodiment.

In the aforementioned configuration, the interface 5 controls data exchange with the server SV via the network NW under the control of the processing unit 6. Meanwhile, the sensor unit 12 generates sensor data indicating the current position, the moving speed, the moving direction, and the like of the terminal device T (in other words, the current position, the moving speed, the moving direction, and the like of the occupant who operates the terminal device T or of the moving body on which the occupant rides) using the GPS sensor and/or the self-contained sensor and the like, and outputs the sensor data to the processing unit 6. Under the control of the processing unit 6, the route search unit 7 transmits the sensor data and the destination data (that is, the destination data indicating the destination to which the moving body on which the occupant operating the terminal device T rides have to move) input from the operation unit 9 to the server SV via the interface 5 and the network NW as search data. Thereafter, the route search unit 7 acquires route data indicating a search result of a route from the current position indicated by the sensor data to the destination indicated by the destination data via the network NW and the interface 5.

Thereafter, the processing unit 6 guides the movement of the moving body along the searched route while exchanging the guidance data (including the sensor data at that time) with the server SV using the acquired route data. At this time, the guidance voice output control unit 1 outputs (sounds) the voice for guidance corresponding to the guidance voice data included in the guidance data acquired from the server SV via the network NW and the interface 5 to the occupant through the speaker 10. This voice for guidance corresponds to an example of "provision information" according to the present application. In addition, when re-guidance voice data according to the example described later is acquired from the server SV via the network NW and the interface 5, the guidance voice output control unit 1 outputs re-guidance voice corresponding to the re-guidance voice data to the occupant through the speaker 10. This re-guidance voice corresponds to an example of "correspondence information" according to the present application.

Meanwhile, under the control of the processing unit 6, the collected sound transmission unit 2 collects the sound in the moving body after the start of outputting the voice for guidance through the microphone 11, generates sound collection data corresponding to the collected sound, and transmits the sound collection data to the server SV via the interface 5 and the network NW. At this time, although the sound collection itself of the sound in the moving body may be performed before the start of the output of the voice for guidance, a target of generation of the sound collection data to be transmitted to the server SV is the sound collected after the start of the output of the voice for guidance. In parallel with this, in a case where an input operation of data necessary for guiding a moving body including the destination is performed in the operation unit 9, the operation unit 9 generates an operation' signal (including the destination data) corresponding to the input operation and transmits the operation signal to the processing unit 6. As a result, the processing unit 6 executes processing as the terminal device T in the navigation processing according to the example while controlling the route search unit 7, the guidance voice output control unit 1, and the collected sound transmission unit 2. At this time, the processing unit 6 executes the processing while storing data necessary for the processing in the memory 8 in a temporal or nonvolatile manner. In addition, a guidance image or the like as an execution result of the processing is displayed on the display 13.

Meanwhile, as illustrated in FIG. 3(*b*), the server SV according to the example includes: an interface 20; a processing unit 21 including a CPU, a RAM, a ROM, and the like; and a recording unit 22 comprising a hard disc drive (HDD), a solid state drive (SSD), or the like. In addition, the processing unit 21 comprises: a route search unit 21*a*; a guidance voice generation unit 21*b*; and a voice recognition unit 21*c*. At this time, each of the route search unit 21*a*, the guidance voice generation unit 21*b*, and the voice recognition unit 21*c* may be implemented with hardware logic circuitry including the above-described CPU or the like constituting the processing unit 21, or may be implemented with software by the CPU or the like reading out and executing a program corresponding to a flowchart illustrating processing on the server SV in the navigation processing of the example described later.

In the aforementioned configuration, navigation data such as map data and the guidance voice data necessary for guiding the movement of each moving body on which the occupant who uses each terminal device T connected to the server SV via the network NW rides is recorded in the recording unit 22 in a nonvolatile manner. Meanwhile, the interface 20 controls data exchange with each terminal device T via the network NW under the control of the processing unit 21. In addition, under the control of the processing unit 21, a route search unit 21*a* searches for the route to the destination indicated by the destination data based on the destination data and the sensor data acquired from any of the terminal devices T, and transmits the route data indicating the search result to the terminal device T that has transmitted the destination data and the sensor data. As a result, the terminal device T performs guidance of a route based on the route data.

Then, during the guidance, the guidance voice generation unit 21*b* generates the guidance voice data in accordance with the guide timing on the route, and transmits the guidance voice data to the terminal device T used by the occupant of the moving body that is the guide target via the interface 20 and the network NW. As a result, the voice for guidance corresponding to the guidance voice data is output (sounded) to the occupant through the speaker 10 of a terminal device T. Meanwhile, if the sound collection data corresponding to the sound collected after the start of output of the voice for guidance corresponding to the guidance voice data has been transmitted to the voice recognition unit 21*c*, the voice recognition unit 21*c* performs voice recognition by a preset method for the sound collection data. At this time, the voice recognition unit 21*c* determines whether the preset specific voice according to the example, representing miss hearing of the voice for guidance that was previously output, is included in the sound corresponding to the sound collection data. The specific voice is, for example, a voice such as "uh-huh?", "eh?", "not heard", "what?", "once more", or "once again", representing miss hearing or desire to listen again, and the person uttered the specific voice may be an occupant who uses the terminal device T or another occupant riding on the moving body on which the aforementioned occupant rides. Furthermore, the voice recognition unit 21*c* subtracts (removes) the voice for guidance from the sound corresponding to the sound collection data to determine whether the specific voice is included in the sound corresponding to the sound collection data. Then, in a case where it is determined that the specific voice is included in the sound corresponding to the sound collection data, the guidance voice generation unit 21*b* generates re-guidance voice data corresponding to the guidance voice data corresponding to the voice for guidance output at the timing corresponding to the timing at which the sound collection data has been generated, and transmits the re-guidance voice data to the terminal device T used by the occupant of the moving body that is the guide target via the interface 20 and the network NW.

At this time, the relationship between the voice for guidance (hereinafter simply referred to as "guidance voice") output at the timing corresponding to the timing at which the sound collection data has been generated and the re-guidance voice corresponding to the re-guidance voice data is, for example, any one or a plurality of relationships of the following i) to v).

i) The guidance voice and the re-guidance voice are all identical in content, speed, volume, and the like.

ii) The volume of the re-guidance voice is larger than the volume of the guidance voice.

iii) The output speed of the re-guidance voice is lower than the output speed of the guidance voice.

iv) The voice quality of the re-guidance voice and the voice quality of the guidance voice are different (for example, the guidance voice is a male voice, and the re-guidance voice is a female voice).

v) The guidance voice is in a simplified form (abbreviated form), whereas the re-guidance voice is in a non-simplified form.

Next, navigation processing according to the example executed in the navigation system according to the example having the above-described configuration and function will be specifically described with reference to FIGS. 3 and 4.

The navigation processing of the example is started when, for example, on the operation unit 9 of the terminal device T of the example used by the occupant who rides on a moving body which is the target of the movement guidance (hereinafter, simply referred to as a "target moving body'), a guidance instruction operation or the like to guide the movement of the target moving body along the route is executed. Note that, in the following description, the terminal device T will be appropriately referred to as a "target terminal device T\ Then, as illustrated in the corresponding flowchart in FIG. 4, when the guidance instruction operation is performed on the operation unit 9 of the target terminal device T, the route search unit 7 in the processing unit 6 of the terminal device T exchanges the search data with a route search unit 21*a* of the server SV and searches for a route on which the target moving body have to move (Step S1). At this time, the route search unit 21*a* of the server SV always waits for transmission of the search data from any of the terminal devices T connected to the server SV via the network NW at that time. In a case where the search data is transmitted from the target terminal device T, the route search unit 21*a* performs a route search based on the search data and transmits the route data as the search result to the route search unit 7 of the target terminal device T via the network NW (Step S15).

Thereafter, when guidance of movement along the route is started by, for example, an operation to start movement on the operation unit 9 of the target terminal device T, the processing unit 6 of the target terminal device T and the processing unit 21 of the server SV start guidance along the route searched at Step S1 and Step S15 while exchanging the guidance data with each other via the network NW (Step S2, Step S16).

Next, after the guidance is started at Step S2, the guidance voice output control unit 1 of the target terminal device T waits for transmission of the guidance voice data from the server SV (Step S3). In a case where the guidance voice data is not transmitted during the standby at Step S3(Step S3: NO), the processing unit 6 of the target terminal device T proceeds to Step S11 described later.

In parallel with the pieces of processing, the guidance voice data is transmitted from the guidance voice generation unit 21*b* of the server SV to the target terminal device T via the network NW at a necessary timing during the route guidance (Step SI7). Then, the guidance voice output control unit 1 of the target terminal device T having acquired the guidance voice data (Step S3: YES) outputs the guidance voice (for example, a guidance voice such as "please goes through the right lane in the three lanes ahead") corresponding to the received guidance voice data through the speaker 10 (Step S4). Thereafter, the collected sound transmission unit 2 of the target terminal device T generates the sound collection data corresponding to the sound collected in the target moving body at least after the start of output of the guidance voice, and starts transmission to the server SV via the network NW (Step S5). Thereafter, the guidance voice output control unit 1 determines whether the output of the guidance voice that was being output at that time has ended (Step S6). In a case where the output continues (Step S6: NO), the process returns to Step S5 described above and continues generation and transmission of the sound collection data. Thereafter, in a case where the output of the guidance voice has ended (Step S6: YES), the collected sound transmission unit 2 continues the generation and transmission of the sound collection data for a predetermined time set in advance (Step S7, Step S7: NO), and when the predetermined time has elapsed (Step S7: YES), the collected sound transmission unit 2 ends the generation and transmission of the sound collection data (Step S8).

Meanwhile, after transmitting the guidance voice data at Step S17 described above, the processing unit 21 of the server SV waits for transmission of the sound collection data from the target terminal device T (Step S18, Step S18: NO). In a case where the sound collection data has been transmitted during the standby of Step S18 (Step S18: YES), the voice recognition unit 21*c* performs voice recognition on a sound corresponding to the transmitted sound collection data and determines whether the specific voice is included in the sound (Step S19). In a case where the determination at Step S19 concludes that the specific voice is not included (Step S19: NO), the processing unit 21 returns to Step S17 described above and continues to provide the route guidance.

By contrast, in a case where the determination at Step S19 concludes that the specific voice is included in the sound corresponding to the sound collection data (Step S19: YES), a guidance voice generation unit 21*b* generates the re-guidance voice data corresponding to the re-guidance voice corresponding to the guidance voice corresponding to the guidance voice data transmitted at Step S17, and transmits the re-guidance voice data to the target terminal device T via the network NW (Step S20). The re-guidance voice corresponding to the re-guidance voice data transmitted at this time has the relationship described in any one or more of i) to v) described above, for example, with respect to the guidance voice corresponding to the guidance voice data transmitted at Step S17. Thereafter, the processing unit 21 determines whether to end the route guidance as the navigation processing of the example because the target moving body has reached its destination or other reasons (Step S21). In a case where the determination at Step S21 concludes that the route guidance does not end (Step S21: NO), the processing unit 21 returns to Step S17 described above and continues to provide the route guidance. By contrast, in a case where the determination at Step S21 concludes that the route guidance ends (Step S21: YES), the processing unit 21 merely ends the route guidance.

On the other side, after the generation and transmission of the sound collection data end at Step S8 described above, the guidance voice output control unit 1 of the target terminal device T waits for transmission of the re-guidance voice data from the server SV (Step S9). In a case where the re-guidance voice data is not transmitted during the standby at Step S9 (Step S9: NO), the processing unit 6 of the target terminal device T proceeds to Step S11 described later. By contrast, in a case where the re-guidance voice data has been transmitted during the standby in Step S9 (Step S9: YES), the guidance voice output control unit 1 of the target terminal device T outputs the re-guidance voice (the re-guidance voice corresponding to the guidance voice output in Step S4) corresponding to the received re-guidance voice data via the speaker 10 (Step S10). Thereafter, the processing unit 6 of the target terminal device T determines whether to end the route guidance as the navigation processing of the example for the same reason as in Step S21 described above, for example (Step S11). In a case where the determination at Step S11 concludes that the route guidance does not end (Step S11: NO), the processing unit 6 returns to Step S3 described above and continues to provide the route guidance. By contrast, in a case where the determination at Step S11 concludes that the route guidance ends (Step S11: YES), the processing unit 6 merely ends the route guidance.

As described above, with the navigation processing according to the example, the re-guidance voice corresponding to the guidance voice is output on the basis of the determination result as to whether the specific voice is included in the sound after the start of output of the guidance voice (refer to Step S10, Step S19, and Step S20 in FIG. 4). Therefore, it is possible to allow the occupant to reliably recognize the content of the guidance voice while reducing the amount of information as the sound to be collected.

In addition, sound collection data corresponding to the collected sound is transmitted to the server SV, and the re-guidance voice data on the basis of the determination result on the presence or absence of the specific voice corresponding to the sound collection data is acquired and output as the re-guidance voice (refer to FIG. 4). Therefore, the processing in the server SV reliably performs necessary guidance while reducing the amount of information as the sound to be collected and the processing load on the terminal device T.

Furthermore, since the sound until the predetermined time is elapsed after the end of the output of the guidance voice by the sound is collected (refer to Steps S5 to S8 in FIG. 4), the sound including the necessary specific voice can be collected.

Moreover, in a case where the content of the re-guidance voice is the same as the content of the guidance voice (refer to, for example, i) described above), the necessary content of the guidance voice can be reliably recognized.

In addition, in a case where the re-guidance voice is output at a volume larger than the volume at the time of outputting the guidance voice (for example, refer to ii) described above), the content of the re-guidance voice corresponding to the guidance voice can be reliably recognized.

Note that, in the navigation processing of the above-described example, the specific voice is a voice of either an occupant who uses the target terminal device T (for example, the driver of the target moving body) or another occupant who rides on the target moving body together with the aforementioned occupant. However, beside to this, for example, the example may be configured such that only the specific voice uttered by the occupant himself/herself who uses the target terminal device T is detected in the server SV by a method of referring to the result of the past voice recognition of the occupant who uses the target terminal device T when the result is recorded in the target terminal device T or the server SV (refer to Step S19 in FIG. 4) or the like. In this case, it is possible to cause the occupant to reliably recognize the content of the re-guidance voice corresponding to the guidance voice on the basis of the specific voice of the occupant.

In addition, in the navigation processing of the above-described example, the determination as to whether the specific voice is included (refer to Step S19 in FIG. 4) and the generation and output of the re-guidance voice data (Step S20 in FIG. 4) are performed in the processing unit 21 of the server SV. In addition to this, however, the example may be configured such that the determination as to whether the specific voice is included, the generation of the re-guidance voice data, and the output of the re-guidance voice data are all performed in the target terminal device T. In this case, it is preferable to cause the external server to execute only the search for the route on which the target moving body moves and the generation of the guidance voice data corresponding the route, for example. In this case, the target terminal device T determines whether the specific voice is included, and generates and outputs the re-guidance voice on the basis of the determination result. Therefore, even in a case where connection to an external server is not possible due to, for example, unavailability of connection to the network NW, the processing in the target terminal device T allows the content of the guidance voice to be reliably recognized while reducing the amount of information as the sound to be collected.

Furthermore, when programs corresponding to the respective flowcharts illustrated in FIG. 4 have been recorded in a recording medium such as an optical disk or hard disk, or have been obtained via a network such as the Internet, and are loaded to and executed on a general-purpose microcomputer or the like, it is also possible to cause the microcomputer or the like to function as the processing unit 6 or the processing unit 21 according to the example.

Furthermore, the example may be configured such that the specific voice representing miss hearing of the guidance voice is changed by a known means such as machine learning. More specifically, for example, in a case where the occupant performs an operation of reproducing the guidance voice again via the software interface of the terminal device although the guidance by the re-guidance voice is not performed because the specific voice is not included in the result of a voice analysis of the example, a word (term or the like) is extracted on the basis of the result of the voice analysis that has already been acquired, and a candidate flag of the specific voice is set to the extraction result. Then, the word is added to the specific voice when a plurality of candidate flags is set, so that the specific voice can be added afterwards. Similarly, the example may be configured such that an operation button for stopping the sound being reproduced is provided, a deletion flag of the corresponding specific voice may be set, and thereby the specific voice can be deleted. Furthermore, the example may be configured such that the specific voice is configured to enable an occupant to be identified (specified) as an individual on the basis of the voice and information unique to the terminal device and a personal specific voice is set according to the individual.

Furthermore, the present example has been described as an example of application to navigation, but not limited thereto. The present example can be applied to a device having a voice recognition function. For example, the present example may be applied to a case of asking back when a smart speaker or a smartphone reads a weather forecast or news aloud.

EXPLANATION OF REFERENCE NUMERALS

1 First output means (guidance voice output control unit)
2 Sound collection means (collected sound transmission unit)
3 Second output means
6,21 Processing unit
10 Speaker
21*b* Guidance voice generation unit
21*c* Voice recognition unit
S Information providing device
T, T1, T2, T3, Tn Terminal device
SV Server

The invention claimed is:

1. An information providing device comprising:

a processor coupled to a memory storing instructions to permit the processor to:

output provision information to be provided, by sound;

collect a sound after start of output of the provision information;

start transmitting of sound collection data of the collected sound to an external server after the start of the output of the provision information, the external server determining whether a preset specific voice is included in the collected sound;

receive a determination result as to whether the preset specific voice is included in the collected sound from the external server; and output correspondence information corresponding to the provision information by sound on a basis of the determination result, wherein, in a case where an operation other than that using voice and for outputting the provision information again is performed by a user, the information providing device adds voice extracted from the sound based on the determination result of unidentified voice as the preset specific voice being included in the sound collected up until the operation is performed, as a new specific voice, and wherein, in the outputting of correspondence information, the processor outputs a correspondence information by sound on a basis of the determination result as to whether the preset specific voice and the added new specific voice are included in the collected sound.

2. The information providing device according to claim 1, wherein the processor:

acquires, from outside, correspondence information on a basis of determination result corresponding to the transmitted sound collection data, and wherein, in the outputting of correspondence information, the processor outputs the acquired correspondence information by sound.

3. The information providing device according to claim 1, wherein the processor:

determines whether the preset specific voice and the added new specific voice are included in the collected sound; and generates correspondence information on the basis of the determination result by the determination, and wherein, in the outputting of correspondence information, the processor outputs the generated correspondence information by sound.

4. The information providing device according to claim 1, wherein, in the collecting of the sound, the processor collects the sound until a predetermined time elapses after an end of the output of the provision information by the sound.

5. The information providing device according to claim 1, wherein a content of the correspondence information is identical to a content of the provision information.

6. The information providing device according to claim 1, wherein, in the outputting of correspondence information, the processor outputs the correspondence information by sound with a volume larger than a volume at a time of outputting the provision information.

7. The information providing device according to claim 1, wherein the preset specific voice is a voice of a recipient who receives the provision information.

8. The information providing device according to claim 1, wherein the provision information has an abbreviated form, and correspondence information corresponding to the provision information has a non-abbreviated form.

9. The information providing device according to claim 1, wherein, in the outputting of correspondence information, the processor outputs the correspondence information by sound with an output speed lower than an output speed at a time of outputting the provision information.

10. The information providing device according to claim 1, wherein, in the outputting of correspondence information, the processor outputs the correspondence information by sound with a voice quality different from a voice quality at a time of outputting the provision information.

11. The information providing device according to claim 1, wherein the new specific voice is configured to be changed by machine learning.

12. An information providing method executed in an information providing device comprising a processor coupled to a memory storing instructions, the information providing method comprising:

outputting provision information to be provided, by sound;

collecting a sound after start of output of the provision information;

start transmitting of sound collection data of the collected sound to an external server after the start of the output of the provision information, the external server determining whether a preset specific voice is included in the collected sound;

receiving a determination result as to whether the preset specific voice is included in the collected sound from the external server; and outputting correspondence information corresponding to the provision information on a basis of the determination result, wherein, in a case where an operation other than that using voice and for outputting the provision information again is performed by a user, the information providing device adds voice extracted from the sound based on the determination result of unidentified voice as the preset specific voice being included in the sound collected up until the operation is performed, as a new specific voice, and wherein, in the outputting of correspondence information, the processor outputs a correspondence information by sound on the basis of a determination result as to whether the preset specific voice and the added new specific voice are included in the collected sound.

13. A non-transitory computer-readable medium having an instructions executable by a processor, the instructions comprising:

outputting, by a guidance voice output controller, provision information to be provided, by sound;

collecting, by a microphone, a sound after start of output of the provision information;

start transmitting of sound collection data of the collected sound to an external server after the start of the output of the provision information, the external server determining whether a preset specific voice is included in the collected sound;

receiving a determination result as to whether the preset specific voice is included in the collected sound from the external server;

outputting, by a speaker, correspondence information corresponding to the provision information by sound on a basis of the determination result; and in a case where an operation other than that using voice and for outputting the provision information again is performed by a user, adding voice extracted from the sound based on the determination result of unidentified voice as the preset specific voice being included in the sound collected up until the operation is performed, as a new specific voice, wherein the speaker outputs a correspondence information by sound on a basis of the determination result as to whether the preset specific voice and the added new specific voice are included in the collected sound.

\* \* \* \* \*